Sept. 16, 1952     R. R. GRAVES     2,610,608
MILKING BARN
Filed Oct. 23, 1947     5 Sheets-Sheet 1
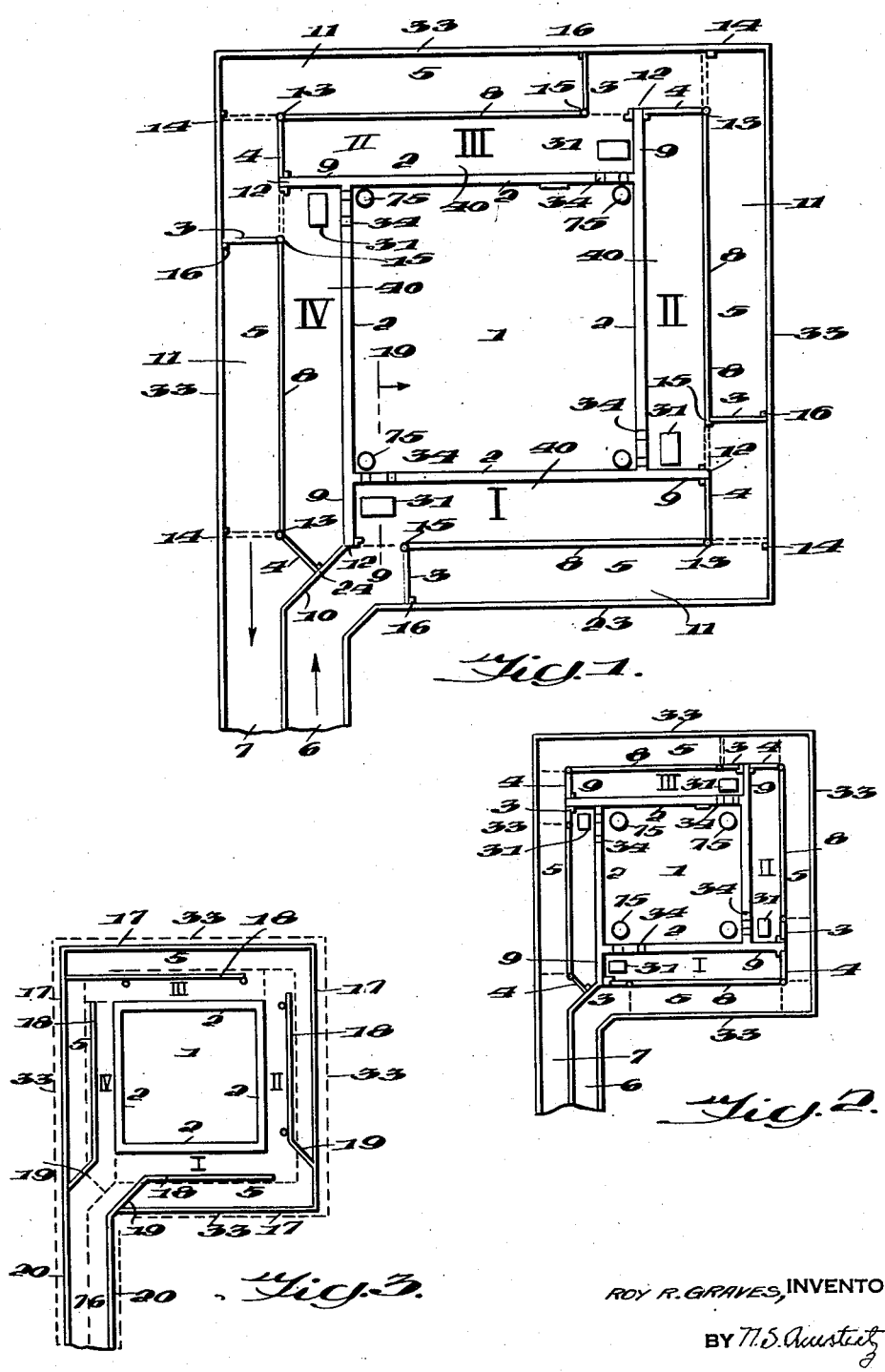
ROY R. GRAVES, INVENTOR
BY T.S. Austeitz
ATTORNEY

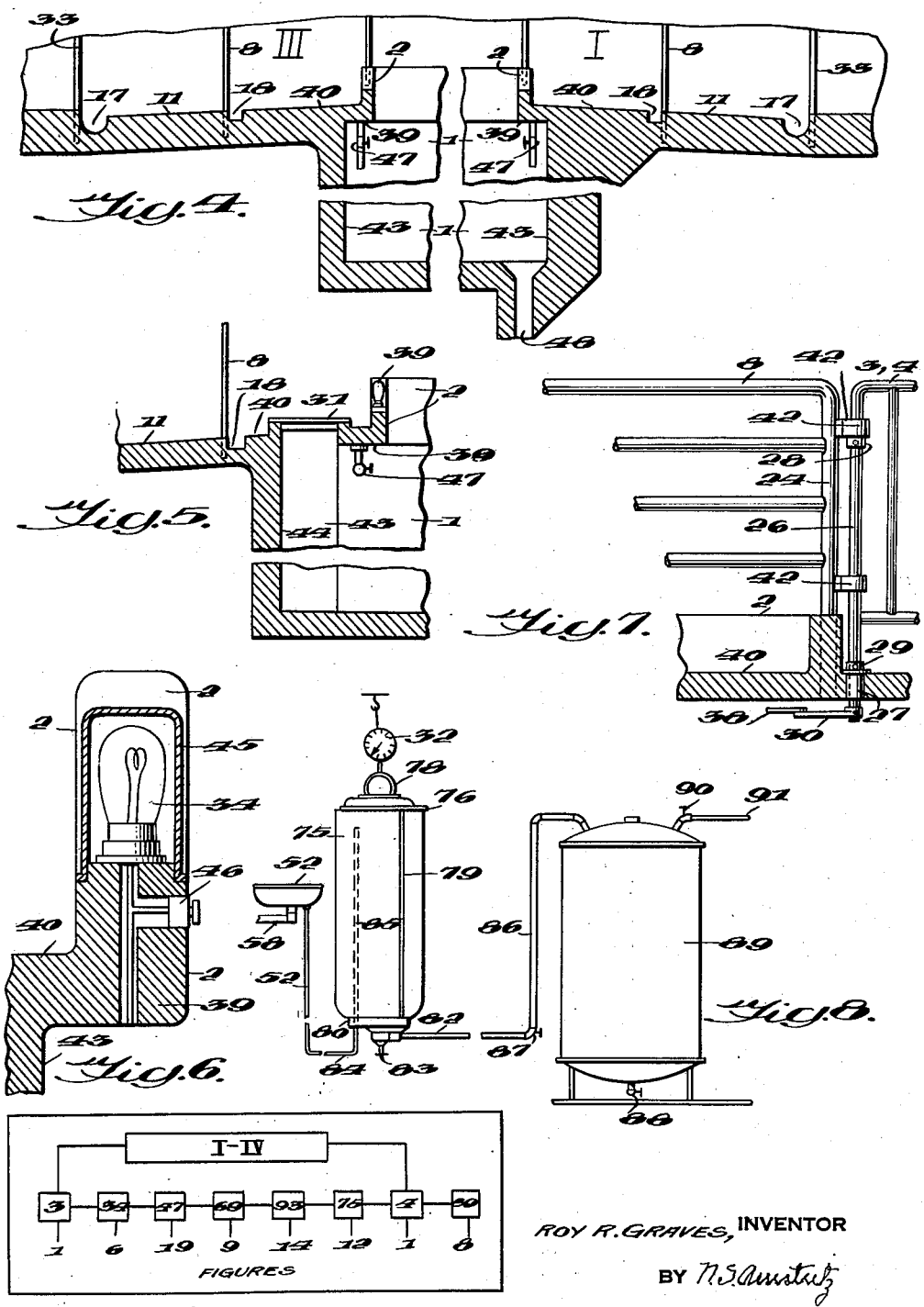

Sept. 16, 1952     R. R. GRAVES     2,610,608
MILKING BARN
Filed Oct. 23, 1947     5 Sheets-Sheet 3
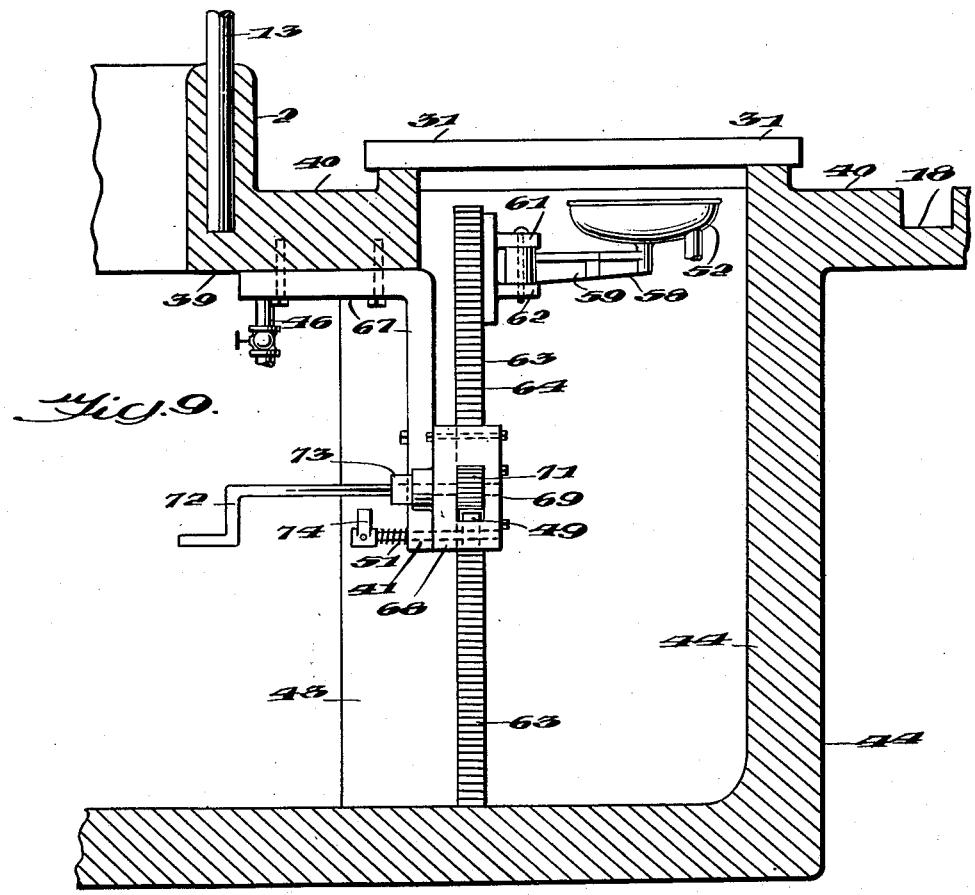
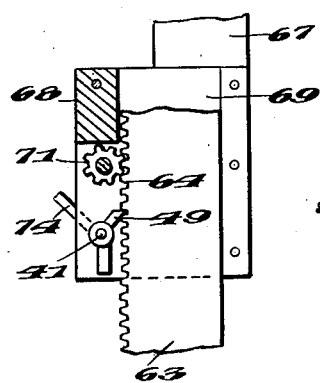
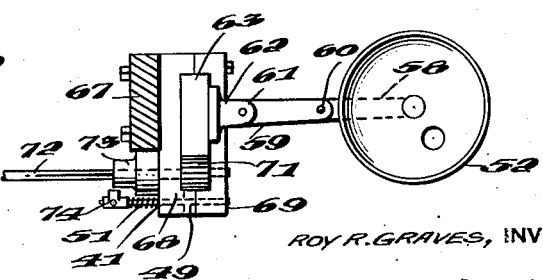
ROY R. GRAVES, INVENTOR
BY *M. S. Armstutz*
ATTORNEY Sept. 16, 1952 R. R. GRAVES 2,610,608
MILKING BARN
Filed Oct. 23, 1947 5 Sheets-Sheet 4
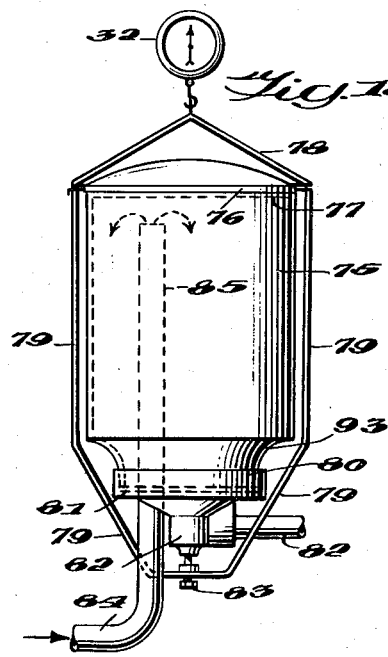
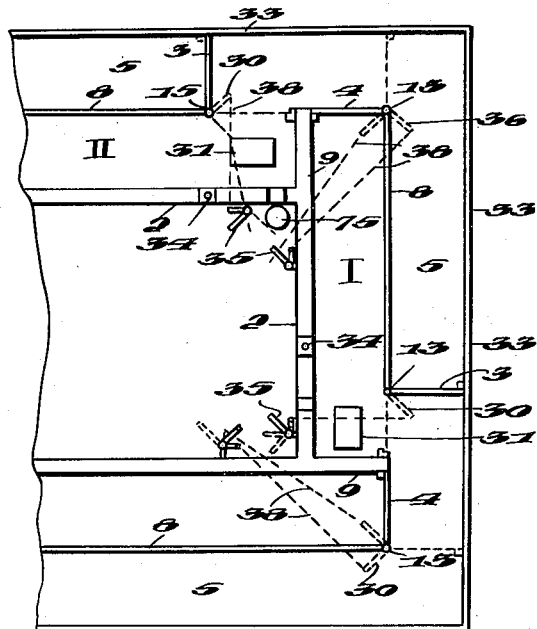
ROY R. GRAVES INVENTOR
BY N.S. Amstutz
ATTORNEY

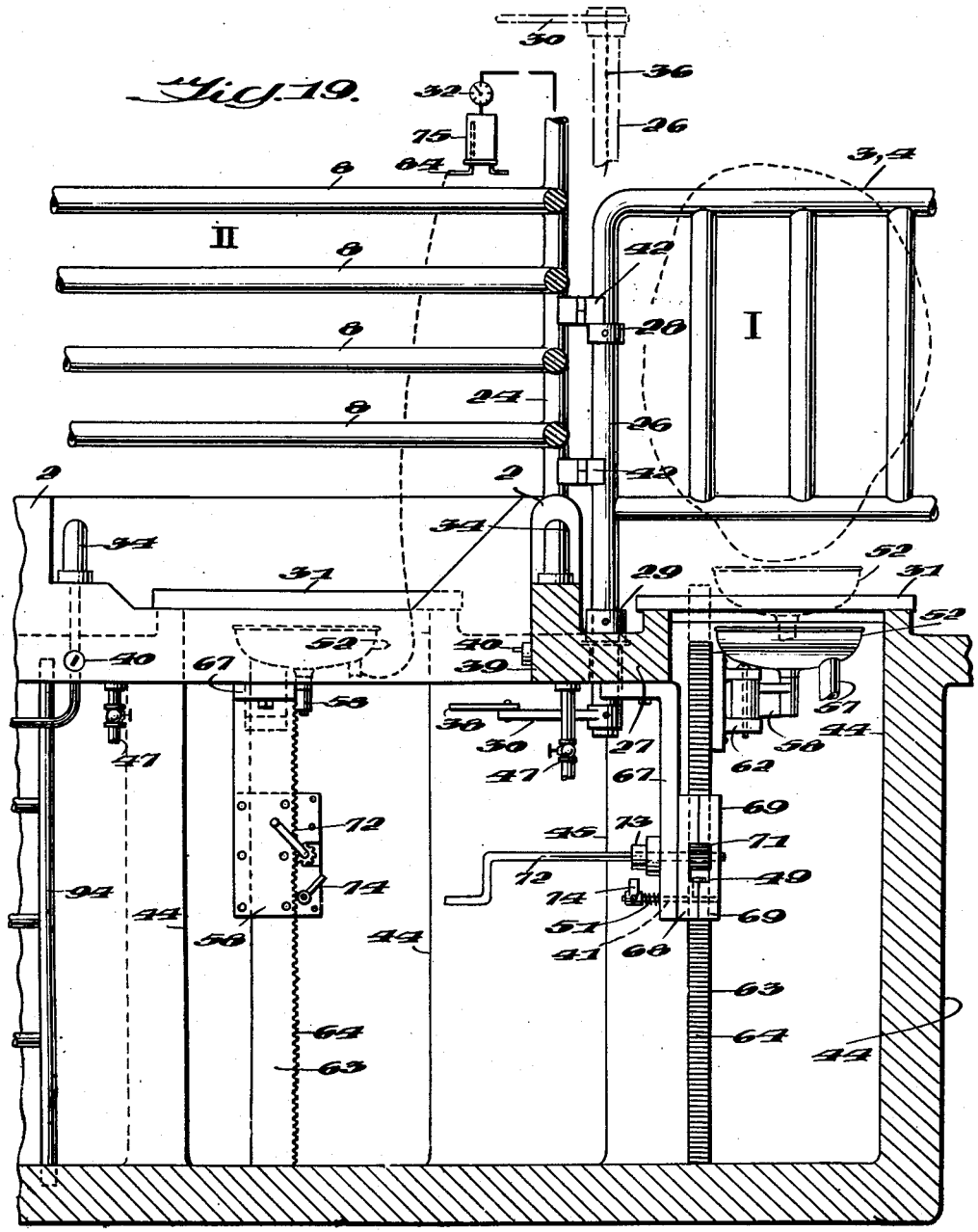
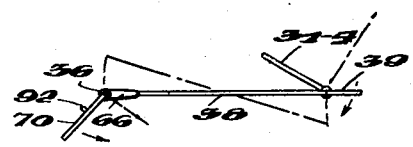

Patented Sept. 16, 1952

2,610,608

UNITED STATES PATENT OFFICE 2,610,608

MILKING BARN

Roy R. Graves, Valparaiso, Ind., assignor, by direct and mesne assignments, to The Graves-Stambaugh Corporation, a corporation of Delaware Application October 23, 1947, Serial No. 781,602

9 Claims. (Cl. 119—14.03)

My invention relates to improvements in milking barns and it more especially consists of the features described in the specification and pointed out in the claims.

The principal object of this invention is to provide an improved milking barn or parlor wherein plural milking of cows under sanitary conditions may be accomplished by a single operator in a minimum time with expenditure of minimum effort.

The milking parlor or barn of this invention includes a substantially square room having barrier walls and a floor for accommodating the cows to be milked. A substantially square operator's pit is located in the center of the floor for accommodating the operator at substantially eye level with the udders of the cows. Four cow stalls are supported on the floor with a cow stall located at each edge of the operator's pit. Each cow stall includes an inner barrier at the edge of the pit, an outer barrier spaced from the inner barrier to accommodate a cow therebetween, an entrance gate and an exit gate. The outer barriers of the cow stalls are spaced from the barrier walls of the substantially square room to provide a normally uninterrupted cow passage about the four cow stalls. The entrance and exit gates of the cow stalls are hinged at the outer barriers of the cow stalls to be swung outwardly into the cow passage toward the barrier walls of the substantially square room for directing cows in a single direction in the cow passage and into and out of the cow stalls. An entrance and exit cow runway enters the substantially square room adjacent one corner thereof and it has a central barrier extending across the cow passage to a point between the nearest entrance gate of one cow stall and the nearest exit gate of an adjacent cow stall. Mechanism controlled by the operator from the operator's pit individually opens and closes the entrance and exit gates of each cow stall.

Thus, as each cow to be milked enters the milking parlor through the entrance runway, it moves along the cow passage until it is directed into a vacant stall by the manipulation of the entrance and exit gates by the operator. After a cow has been milked, it is directed by the operator through manipulation of the entrance and exit gates into the cow passage and out of the milking parlor through the exit runway. Each cow stall is provided with a milking machine and a weigh jar under the control of the operator in the pit for milking the cow in that stall and inspecting and weighing the milk. The withdrawn milk is then transferred under the control of the operator in the pit to a tank outside of the milking parlor. Before applying the milking machines to the cows, the operator thoroughly washes and cleans the cows udders and teats. This four stall arrangement about the central operator's pit provides maximum plural milking of cows by a single operator in a minimum of time with expenditure of minimum effort and with minimum fatigue. The central operator's pit is relatively small and all necessary cow directing, milking and cleaning equipment is readily available to the operator whose walking steps are kept at a minimum. The time for preparing and milking each cow is such that a single operator in this four stall milking parlor can perform substantially continuous milking of cows without delay and without undue effort.

To make the dimensions of the substantially square operator's pit as small as possible and, hence, to ease the effort expended by the operator, the four cow stalls are preferably so arranged that the forward end of each cow stall overlaps the rear end of the next succeeding cow stall. The edges of the floor at the central operator's pit are provided with an upwardly extending curb and the floor slopes gradually downwardly from the curb to the barrier walls of the substantially square room. An open drain is provided in the floor adjacent the barrier walls and extends around the room so that the floor may be flushed from the pit and drained in a direction away from the operator's pit. Each cow stall may also be provided with an open drain communicating with the outer drain to assist in flushing and draining the floor.

The floor and curb preferably overhang the operator's pit to provide freedom of movement of the operator at the edges of the pit. The curb, which prevents cows from slipping into the pit and which aids in keeping the pit clean, is provided with recesses near the rear of each stall to provide uninterrupted access to the udders of the cows from the operator's pit. Pipes connecting to the milking machines, weigh jars and hot and cold water connections in the pit are located out of the way under the overhanging portion of the floor. The barriers forming the cow stalls, the entrance and exit gates, the pipes and fittings are preferably all made of stainless steel to provide best sanitary conditions and pleasing appearance.

Other objects of this invention reside in the details of construction of the milking barn or parlor of this invention and in the cooperative relationship between the component parts thereof.

With these and other related ends in view I illustrate on the accompanying drawings such instances of adaptation as will disclose the broad underlying principles of the invention without limiting myself to the specific details shown thereon and described herein.

Fig. 1 is a top plan view of a milking pit associated with four separate stalls and a continuous external runway, the gates being opened and all the stalls empty.

Fig. 2 is a diagrammatic view, on reduced scale similar to Fig. 1, showing all the stall gates closed when a cow would be in each stall ready to be milked.

Fig. 3 is a view similar to Fig. 2 showing the provision made for draining the stalls and the exterior runway.

Fig. 4 is a cross section of stalls I and III.

Fig. 5 is a detached section through a milking operation recess.

Fig. 6 is an enlarged elevation in section of a lamp mounted on each one of the four sides to a stall.

Fig. 7 is an elevation of a barrier to a stall and a hinged gate.

Fig. 8 is a diagrammatic elevation of milk weighing and storing facilities.

Fig. 9 is an elevation in section showing the adjustable support for the milking machine receiving pan.

Fig. 10 is a plan view of the support shown in Fig. 9.

Fig. 11 is a detached view, in plan of the elevating means shown in Figures 9 and 10.

Fig. 12 is an elevation of a self weighing milk container.

Fig. 13 is a plan view of Fig. 12.

Fig. 14 is a detached elevation of a milking receiving pan.

Fig. 15 is a plan view of a portion of Fig. 1 showing inter-connected gate controls.

Fig. 16 is a detached plan view of one of the gate controls.

Fig. 17 is a detached plan of an operating lever for opening and closing the gates.

Fig. 18 is an assembled electric latch for holding a gate closed.

Fig. 19 is an enlarged elevation in section of Fig. 1 on line 19—19 showing the serving recess of stall (one) I and in elevation the recess of stall II.

Fig. 20 is a diagrammatic plan view of the automatic locking feature of a hand lever, cranks and connecting link for holding a gate closed on dead centers.

Fig. 21 is a flow sheet.

In practicing my invention I may use whatever modifications or changes that the exigencies of varying conditions may demand without departing from the broad spirit of the invention.

The structure of my milking barn is closely associated with my co-pending application, Serial No. 681,619 for Hay Barn filed July 5, 1946; and Serial No. 697,018 for Cow Barn filed September 14, 1946.

The cow barn is directly connected to the milking barn by two separate adjacently located passages, one for cows going to be milked and one for cows returning from the milking barn.

There are four milking stalls, numbered respectively, I, II, III, and IV. To each of these stalls there is a hinged entrance gate 3 and a hinged exit gate 4. There is an external runway or cow passage 5 that is connected to runway 7 leading to the cowbarn. The arrows in runways 6 and 7 of Fig. 1 indicate the direction that the cows will move in the two runways. The runway 6 leads from the cowbarn to runway 5 of the milking barn at the entrance of runway 5.

The attendant's pit 1, Figure 1, is of sufficient depth so that the level of the eye of the attendant will be approximately on the level of the udders of the cows. A curb 2 surrounds the pit on all sides.

The cow positions in stalls I-IV is separated from the external runway 5 by a barrier 8. The curb 2 at the entrance of each stall is extended forwardly at 9 for the width of each stall. At the exit of stall IV there is a diagonal partition or barrier 10 which diverts incoming cows through passage 6 to the external passageway or alley 5. The cement floor 40 of the stalls and the cement floor 11 of runway 5 are on the same level as the bottom of the curb 2 formed around the pit. There is an external barrier wall 33 which encloses the entire milking area, Fig. 1.

The drainage of the milking areas is shown in Fig. 3. This includes an external drain 17 inside of the external barrier wall 33 and short drains 18 between the alley 5 and the stalls I-IV. These short drains connect to the drains 17 at point 19 within the milking area. The drains along side the runways 6 and 7 are designated by the numeral 20. These drains or coves may be modified as desired.

This arrangement of the open drain permits the quick flushing of the floors 11 and 40 to promote the utmost in sanitation within the milking barn and to enable the operator to quickly remove any signs of unsightly droppings. This is accomplished by the correlated slope of the floors and by the surface drains which avoid the clogging that underground drains are subject to when the droppings of a considerably number of cows must be taken care of continuously. Furthermore, these surface drains being readily cleaned are less liable to give off bad odors.

The crown or center line between passages 6 and 7 is raised slightly and slopes toward each side and the level of the floor 40 next to the curb 2 is also slightly raised above the outer edge of the floor 11 in the alley 5 to form a natural slope outward from the curb 2. The highest point of the drain 17 will be approximately inside of the external wall 33 and in the corner adjoining the front gate of stall II.

The slope of the floors 40 and 11 is shown in Fig. 4. A drain 48 leads out from the floor of the operator's pit 1 also shown in Figure 4.

The curb 2 overhangs the pit 1 at 39. This makes it possible to position all the service pipes and the electric wiring for the spot lights 34 under this overhang where they will be out of sight. In contrast to this method of disposing of the service pipes, conventional milking barns give one the impression through the multiplicity of the posts and so forth as though one were looking at a forest. Keeping all the pipes under the overhang permits shortened pipe lengths, the pipes are more accessible for repairs, and they do not collect dust.

Under this overhang there is a pipe for cold water 47, a similar pipe for hot water, a pipe for conducting a vacuum to the milking unit, a sanitary pipe for carrying the milk from the milking unit to an adjoining dairy room, and a conduit for electric wiring to the lamps 34 controlled by switch 46. Altogether five separate pipes are required for service for the four milking stalls.

Another advantage of the overhang 39 is that it enables the operator to stand with his chest against the curb and provides a free space for his feet and knees while placing the milking equipment on the cow. There is a conduit for the service pipes leading to a processing room (not shown) in which the vacuum receiving tank 89 is located, shown diagrammatically in Fig. 8. If desired the connecting conduit between the milking pit and the processing room (not shown) may be divided into two parts to separate the service pipe 82 for milk transfer from the other service pipes. There is a supply pipe 86 connecting the processing tank 89 with the milk line 82. A control valve 87 is located between the pipes 82 and 86. The milk line 86 is simply a continuation of the milk line 82. There is an outlet 91 from the processing tank 89 that has a control valve 90. At the bottom of the tank 89 there is a vacuum line control valve 88. The sanitary milk line 82 may be easily taken out for washing, and replaced when necessary.

Between the entrance gates 3 and the curb 2 of each stall there is a floor opening leading to the milking equipment recess 44 over which there are covers 31. When the cows are in position in the stalls with their udders directly over the recesses 44 the cover 31 is removed and the milking equipment is put into operation to bring the milk receiving pan 52 directly under an udder, Figs. 9 and 19. The covers 31 prevent the cows stepping into milking areas 44 while entering the stalls, and when the milking is completed the cover is replaced so that as the cow leaves the stall it will likewise be protected against stepping into the milking area.

The curb 2 may be raised about 12 inches more or less above the stall floors 40 but opposite the milking areas 44 the curb is cut away to give the operator more ready access to washing the cow's udder and attaching the teat cups thereto.

A short length of hose from pipe 47 enables the operator to quickly and easily wash the udder of the cow and also to wash off the floor of the stall. Lamps 34 are protected by heat resistant or tough glass 45, Figure 6. This arrangement overcomes the obstacle of conventional overhead lighting which invariably casts a shadow from the cow's body on the udder which makes it almost impossible to do hygienic milking. This is particularly true in winter when the milking is usually done before and after daylight. The lamp covers 43 are preferably made of shatterproof glass or special bactericidal characteristics.

Instead of the conventional valve shown in the pipe 47 a ball valve may be substituted so as to turn the water on when a short length rubber hose, not shown, is raised to raise the water on the cow's udder and when the tube is dropped the water is automatically shut off, Fig. 4. The free end of the hose is supplied with a conventional spray head. When the washing is completed the milker uses a paper towel to dry the udder and the teats, it is important that the water is always warm and maintained at the same temperature for washing for this warm water effects the nervous system in such a manner as to result in a rapid and complete letting down of the milk. This insures a more complete and rapid milking of each cow.

The milking equipment and its control is shown in Figures 9 and 19 of Sheets 3 and 5. After all the washing has been completed the covers 31 are removed from the milking recesses 44 and the milk receiving pan 52 is raised to bring it under the cow's udder as shown in dotted lines on Fig. 19. The milk receiving pan 52, Fig. 14, is supported on a horizontally adjustable arm 58, Fig. 10, and it has a boss 53 from which a projection 54 depends. This projection has a groove 55 engaged by a releasing catch 56. The vacuum line 95 is connected conventionally to the vacuum cups. There is an outlet from the receiving pan 52 through pipe 57 which leads through pipes 84 and 85 to the weighing container 75.

The milk receiving pan 52 supported on the arm 58 is raised into position and lowered after the milking is completed by a rack bar 63 which has movement in a casing 68, and which is supplied with teeth 64 throughout the length of its one edge. At the upper end of the bar there is a bracket 62 having a pivot 61 for the extension arm 59, which arm is pivoted at 60 to the arm 58, Fig. 10, to provide for a universal horizontal change in position of the milk receiving pan 52.

The mechanism for raising and lowering the milk receiving pan 52, is supported on a bracket 67 that is attached to the underside of the overhang 39. A pinion 71 engages the teeth 64, (Fig. 11, also Figs. 9 and 10 of Sheet 3) and is turned by a crank 72 which has bearing in a boss 73 of the cap 68.

To the cap 68 there is attached an outer cap 69, both of these caps forming an enclosing casing for the rack 63. In order to automatically lock the rack bar 63 in any vertical position there is a dog or a pawl 49 that engages the teeth 64, and it is attached to a short spindle 41 on which there is a spring 51, Fig. 10. At the outer end of the spindle 41 there is an operating lever 74. As the rack 63 is raised by the operation of turning the crank 72 the pawl 49 engages the rack 63 tooth by tooth. When the milking operation is completed the operator disengages the pawl 49 from the teeth 64 by means of the hand lever 74 while the weight of the rack and its attachments is under the control of pinion 71 and the crank 72. This unique method of arranging a milking barn with a unitary pit, Fig. 1, with a milking stall on each of its four sides, makes it easier to produce clean milk, and also easier to get more milk in a shorter milking period.

The barrier 8 is formed of stainless steel tubes which may be arranged as shown in Fig. 19 or modified as desired. The gates 3 and 4 are hinged to vertical posts as shown in Fig. 15, posts 15 for gates 3 and posts 13 for gates 4. There are latching posts 12 for gates 3 and 4 and there are stops 14 on the outer barrier 33 for gates 4 and stops 16 for gates 3. The latch posts 12 for gates 3 and 4 may be provided if desired with an electric catch, Fig. 18, in which there is a stop 50 on the posts 24, and a beveled latch 21 that is pressed in a forward direction by spring 22. A magnet 23 will move the catch 21 against the spring 22 when a push button 25 is closed in an electric circuit which includes the magnet 23.

The latch post 24 of Fig. 18 is the post on the diagonal barrier of Fig. 1. The hinged member of gates 3 and 4 is 26. It is hinged to posts 24 or 12 by hinges 42, Figs. 7 and 19. There is a floor plate and sleeve 27, a top collar 28, and a bottom collar 29 on the member 26. The bottom collar 29 holds the gate on the sleeve 27 and a top collar 28 abutting a hinge 42 prevents the gate being lifted. At the bottom end of the member 26 on the underside of the floor there is a crank 30 which is connected to an operating link 38 for opening and closing the gates.

As shown in Figures 15-17 gate operating levers and links are shown as positioned beneath the floor. This structure requires the co-operation of bell crank levers 35 which serve as hand levers, these are pivoted at 36 and they have a short extension 37 that is connected to links 38.

The modification shown in Fig. 20 places the link 38 in a raised position instead of beneath the floor as shown in Figures 15-17. The crank 30 is placed on an extension of 26 and the links 38 connect it to a crank 66 above the center 36 and at the bottom of 36 on the top surface of the curb 2 there is a hand lever 70. A stop 92 is provided to prevent the hand lever 70 being moved too far. In the adaptation shown in Figures 15-17 the handles to operate the gates are located beneath the floor 40 and the overhang 39 but in Fig. 20 the handle 70 and the stop 92 are on the upper face of the curb 2.

The milk is received from the vacuum cups through the vacuum line, Fig. 8, to the Pyrex milk receiver 75. This is held suspended from a weighing scale 32 secured by a support 78 from the top cover 76. The milk receiving tank 75 has a base 80, Fig. 12, and a reduced diameter bottom 93. There is a top gasket 77 and a bottom gasket 81. There are 2 tension rods 79 which are positioned beneath the outlet portion of the tank. There is an adjusting screw 83 for putting tension on the rods 79 and the cover 76. The inlet pipe 84 extends up into the tank 75 to near the top of it by the pipe 85, and from the outlet 82 there is a sanitary milk line 86 with a control valve in it 87. This 86 line leads to tank 89.

In many of the figures the sizes of inter-connecting pipe is more or less diagrammatic. In the main, they are smaller in diameter than is shown in the drawings.

Access to the pit is by means of a ladder 94 shown on Fig. 19.

The self locking feature shown on Fig. 20 may also be attained in Figs. 15-16. In some instances the self locking feature of Fig. 20 may also supplant the electric latching device shown on Fig. 18.

The weighing jars 75 are located and supported in any desired manner for instance as shown in Fig. 19 wherein they have the vertical member 24 to extend upwards diagrammatically. They are shown in Fig. 1 also. The weighing scales 32 will face the attendant so as to make it an easy matter to note the milk weight but they are located in the corner of the pit out of the way of the operator.

The horizontal adjustment of the milk receiving pan shown on Fig. 10 makes it possible to position the pan to accommodate different size animals regardless of changes that exist either in horizontal dimensions or differences in height of the cow's udders, the latter being taken care of by the raising and lowering of the milking attachment as shown in Fig. 9 and in Fig. 19.

Fig. 21 on Sheet 2 is a diagrammatic figure showing the inter-relation between the different parts of my milking system.

A cold water pipe 46 is shown on Fig. 9 and a vacuum line connection 95 is appearing on Fig. 14.

It is essential to note that a very important feature of my invention is the provision for handling the milk from the time it is taken from the cow to the weighing jar and through to the storage tank without exposure to atmospheric air at any time, controlling transference of milk from the weighing jar to the storage tank by a difference in degree of vacuum in the two containers that is approximately fifteen inches in the weighing jar and twenty inches in the storage tank thus avoiding the conventional open removal of milk from the weighing jar.

In the use of a long pipe 85 in the weighing jar 75, Fig. 8, which terminates near the top of the jar causes delivering of incoming milk from the top of the pipe to a cascading flow against the walls of the jar, which will extract any vestige of oxygen that may be present.

In the raising and lowering of the milking equipment shown in Figs. 9 and 19 should it be found inconvenient for the operator to use both hands, one to move the crank 72 and lever 74 with the other hand, the operation may be simplified so that one hand may be free by connecting a wire to the lever 74 and to a foot lever, not shown.

The milk receiving pan 52 shown in Fig. 14 may be substituted by any other device for direct delivery of milk from the teat cups to the weighing jar.

What I claim is:

1. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, four cow stalls supported on the floor with a cow stall located at each edge of the operator's pit and extending beyond the edge of the operator's pit to overlap a portion of the next succeeding cow stall, each cow stall including an inner barrier at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, and mechanism operatively associated with the entrance and exit gates and controlled from the operator's pit for individually opening and closing the entrance and exit gates of each cow stall.

2. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, four cow stalls supported on the floor with a cow stall located at each edge of the operator's pit and extending beyond the edge of the operator's pit to overlap a portion of the next succeeding cow stall, each cow stall including an inner barrier at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, mechanism operatively associated with the entrance and exit gates and controlled from the operator's pit for individually opening and closing the entrance and exit gates of each cow stall, and an entrance and exit cow runway entering the substantially square room adjacent one corner thereof and having a central barrier extending across the cow passage to a point between the nearest entrance gate of one cow stall and the nearest exit gate of an adjacent cow stall.

3. A milking parlor for plural milking of cows by a single operator comprising, a floor for accommodating the cows to be milked, a substantially square operator's pit in the center of the floor for accommodating the operator, four cow stalls supported on the floor with a cow stall located at each edge of the substantially square operator's pit and including an inner barrier at each edge of the substantially square operator's pit for forming the inner barriers of the four cow stalls, each inner barrier extending forwardly beyond such edge of the operator's pit to form a rear barrier for each next succeeding cow stall, an outer barrier parallel to and spaced from each inner barrier and extending from a point substantially in line with the forwardly extending end of the inner barrier to a point short of the rear barrier to accommodate a cow therein, an entrance gate for each cow stall hinged at the rear end of the outer barrier and closing against the extending end of the rear barrier, an exit gate for each cow stall hinged at the forward end of the outer barrier and closing against the forwardly extending end of the inner barrier, a substantially square external barrier spaced from the outer barriers of the four cow stalls to provide a normally uninterrupted cow passage about the cow stalls, the hinged entrance and exit gates of the four cow stalls opening outwardly into the cow passage for directing cows in a single direction in the cow passage and into and out of the cow stalls, and mechanism operatively associated with the entrance and exit gates and controlled from the operator's pit for individually opening and closing the entrance and exit gates of each cow stall.

4. A milking parlor for plural milking of cows by a single operator comprising, a floor for accommodating the cows to be milked, a substantially square operator's pit in the center of the floor for accommodating the operator, four cow stalls supported on the floor with a cow stall located at each edge of the substantially square operator's pit and including an inner barrier at each edge of the substantially square operator's pit for forming the inner barriers of the four cow stalls, each inner barrier extending forwardly beyond such edge of the operator's pit to form a rear barrier for each next succeeding cow stall, an outer barrier parallel to and spaced from each inner barrier and extending from a point substantially in line with the forwardly extending end of the inner barrier to a point short of the rear barrier to accommodate a cow therein, an entrance gate for each cow stall hinged at the rear end of the outer barrier and closing against the extending end of the rear barrier, an exit gate for each cow stall hinged at the forward end of the outer barrier and closing against the forwardly extending end of the inner barrier, a substantially square external barrier spaced from the outer barriers of the four cow stalls to provide a normally uninterrupted cow passage about the cow stalls, the hinged entrance and exit gates of the four cow stalls opening outwardly into the cow passage for directing cows in a single direction in the cow passage and into and out of the cow stalls, mechanism operatively associated with the entrance and exit gates and controlled from the operator's pit for individually opening and closing the entrance and exit gates of each cow stall, and an entrance and exit cow runway entering the cow passage adjacent one corner thereof and having a central barrier extending across the cow passage to the forwardly extending end of the inner barrier nearest thereto.

5. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, four cow stalls supported on the floor with a cow stall located at each edge of the operator's pit and extending beyond the edge of the operator's pit to overlap a portion of the next succeeding cow stall, each cow stall including an inner barrier at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, a curb extending upwardly from the floor about the edge of the substantially square operator's pit, the floor sloping gradually downwardly from the curb to the barrier walls of the substantially square room, and an open drain in the floor adjacent the barrier walls of the room and extending around the room for draining the gradually sloping floor in a direction away from the operator's pit.

6. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, four cow stalls supported on the floor with a cow stall located at each edge of the operator's pit and extending beyond the edge of the operator's pit to overlap a portion of the next succeeding cow stall, each cow stall including an inner barrier at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, a curb extending upwardly from the floor about the edge of the substantially square operator's pit, the floor sloping gradually downwardly from the curb to the barrier walls of the substantially square room, an open stall drain in the floor along each outer barrier of each stall and extending toward the barrier walls of the room, and an open drain in the floor adjacent the barrier walls of the room and communicating with the stall drains and extending around the room for draining the gradually sloping floor in a direction away from the operator's pit.

7. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, the floor overhanging the pit to provide freedom of movement of the operator at the edges of the pit and the overhanging portion of the floor having an upwardly extending curb to prevent the cows from slipping into the pit, four cow stalls supported on the floor with a cow stall located at each edge of the operator's pit and extending beyond the edge of the operator's pit to overlap a portion of the next succeeding cow stall, each cow stall including an inner barrier on the curb at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, the upwardly extending curb at the edges of the operator's pit being provided with recesses near the rear of each stall to provide ready access to the udders of the cows from the operator's pit, and mechanism operatively associated with the entrance and exit gates and controlled from the operator's pit for individually opening and closing the entrance and exit gates of each cow stall.

8. A milking parlor for plural milking of cows by a single operator comprising, a substantially square room having barrier walls and a floor for accommodating the cows to be milked, a substantially square operator's pit in the center of the floor for accommodating the operator at substantially eye level with the udders of the cows, the floor overhanging the pit to provide freedom of movement of the operator at the edges of the pit and the overhanging portion of the floor having an upwardly extending curb to prevent the cows from slipping into the pit, four cow stalls supported on the floor with a cow stall located at each edge of the operator's pit and extending beyond the edge of the operator's pit to overlap a portion of the next succeeding cow stall, each cow stall including an inner barrier on the curb at the edge of the pit, an outer barrier spaced from the inner barrier to accommodate a cow therebetween, an entrance gate and an exit gate, the outer barriers of the cow stalls being spaced from the barrier walls of the substantially square room to provide a normally uninterrupted cow passage about the cow stalls, the entrance and exit gates of the cow stalls being hinged at the outer barriers of the cow stalls to be swung outwardly into the cow passage toward the barrier walls of the substantially square room for directing cows in a single direction in the cow passage and into and out of the cow stalls, the upwardly extending curb at the edges of the operator's pit being provided with recesses near the rear of each stall to provide ready access to the udders of the cows from the operator's pit, a milking machine for each cow stall manipulatable by the operator from the operator's pit, a weigh jar operatively associated with each milking machine and accessible to the operator in the operator's pit, water connections in the operator's pit adjacent each cow stall, pipes located under the overhanging portion of the floor extending to the milking machines, weigh jars and water connections, and mechanism operatively associated with the entrance and exit gates and controlled from the operator's pit for individually opening and closing the entrance and exit gates of each cow stall.

9. A milking stall structure, including four interconnected cow stalls adapted to be carried by a floor and arranged about a substantially square operator's pit in the floor with a cow stall at each edge of the operator's pit, comprising an inner barrier for each edge of the substantially square operator's pit forming the inner barriers of the four cow stalls, each inner barrier extending forwardly beyond such edge of the operator's pit to form a rear barrier for each succeeding cow stall, an outer barrier parallel to and spaced from each inner barrier and extending from a point substantially in line with the forwardly extending end of the inner barrier to a point short of the rear barrier to accommodate a cow therein, an entrance gate for each cow stall hinged at the rear end of the outer barrier and closing against the extending end of the rear barrier, and an exit gate for each cow stall hinged at the forward end of the outer barrier and closing against the forwardly extending end of the inner barrier.

ROY R. GRAVES.

REFERENCES CITED

The following references are of record in the file of this patent:

UNITED STATES PATENTS

| Number | Name | Date |
|---|---|---|
| Re. 22,657 | Babson et al. | Aug. 7, 1945 |
| 1,863,603 | Marshall | June 21, 1932 |
| 1,915,516 | Carpenter | June 27, 1933 |
| 1,959,716 | Hapgood | May 22, 1934 |
| 1,968,564 | Luks | July 31, 1934 |
| 1,972,144 | Hapgood | Sept. 4, 1934 |
| 1,987,955 | Hapgood | Jan. 15, 1935 |
| 2,021,591 | Corderoy | Nov. 19, 1935 |
| 2,039,562 | Shodron | May 5, 1936 |
| 2,050,356 | McCornack | Aug. 11, 1936 |
| 2,236,851 | Haselton | Apr. 1, 1941 |
| 2,269,012 | De Carli | Jan. 6, 1942 |
| 2,305,259 | Jeffers | Dec. 15, 1942 |
| 2,358,000 | Cornell | Sept. 12, 1944 |
| 2,472,122 | Polivka | June 7, 1949 |

FOREIGN PATENTS

| Number | Country | Date |
|---|---|---|
| 10,734 | Great Britain | May 18, 1908 |

OTHER REFERENCES

Starline Milking Parlor Stall, manufactured by Starline, Inc., formerly Hunt-Helm-Ferris and Co., Inc., Harvard, Illinois. January 21, 1933.

Farm Implement and Machinery Review, November 1, 1946, page 645.